Dec. 7, 1926.  1,609,462
F. F. B. CHAPMAN
CHILD'S VEHICLE
Filed Jan. 6, 1926
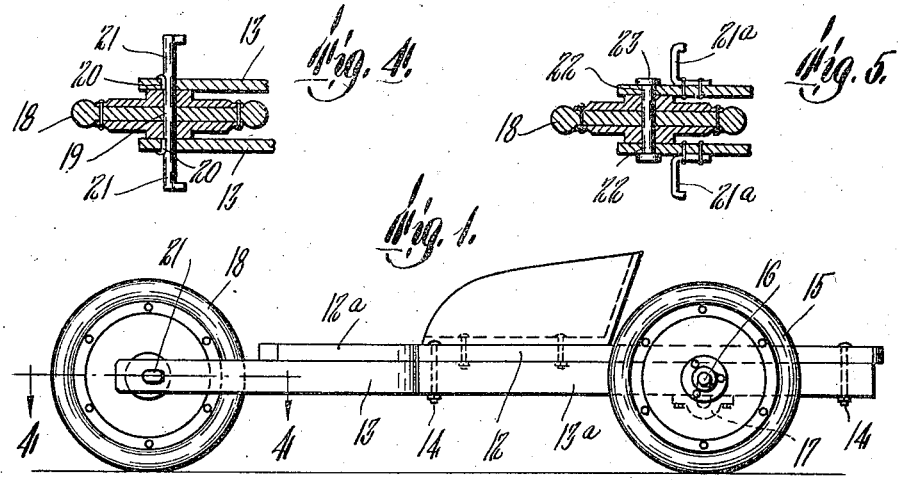
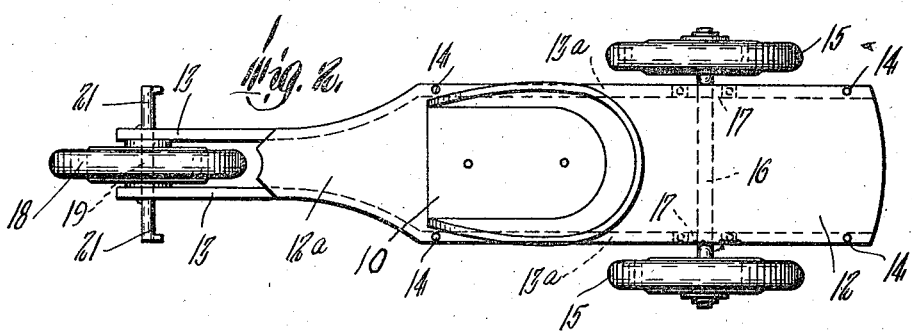
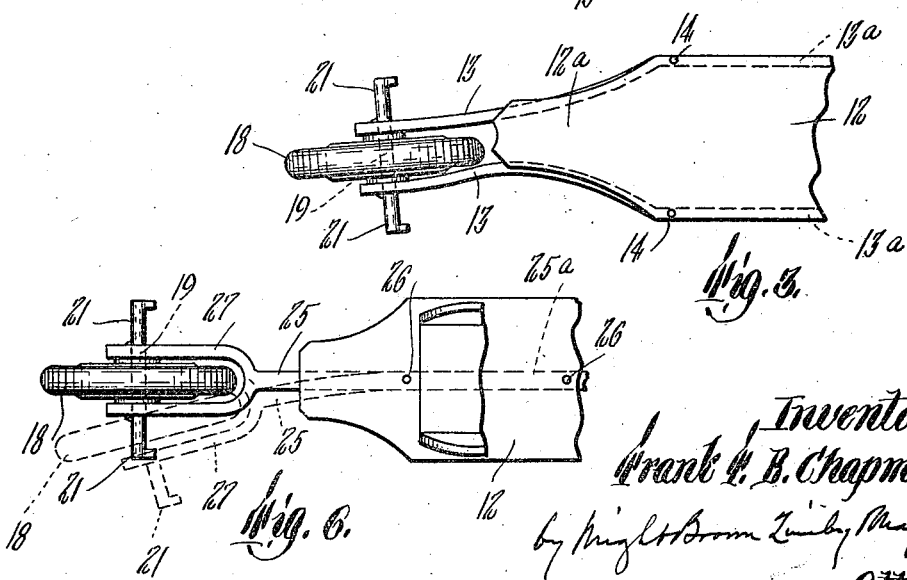

Patented Dec. 7, 1926.

1,609,462

UNITED STATES PATENT OFFICE.

FRANK F. B. CHAPMAN, OF HOLLIS, NEW HAMPSHIRE.

CHILD'S VEHICLE.

Application filed January 6, 1926. Serial No. 79,551.

This invention relates to a wheeled vehicle of the coaster type, including a platform and running gear including rear wheels on an axle, fixed to the platform, and a steering wheel located in advance of the platform and adapted to be turned by the rider to change the course of the vehicle.

The object of the invention is to provide a simple and durable structure including improved means for enabling the rider to turn the steering wheel.

Of the accompanying drawings forming a part of this specification—

Figure 1 is a side view of a child's vehicle embodying the invention.

Figure 2 is a top view of the same.

Figure 3 is a view similar to a portion of Figure 1, showing the steering wheel deflected from its normal position.

Figure 4 is a section on line 4—4 of Figure 1.

Figure 5 is a view similar to Figure 4, showing a modification.

Figure 6 is a view similar to Figure 3, showing a different embodiment of the means for rendering the steering-wheel dirigible.

The same reference characters indicate the same parts in all of the figures.

Referring first to Figures 1 to 5, 12 designates a platform which may be provided with a seat 10. 13, 13 designate forwardly projecting resilient spaced apart arms, fixed to the platform, and adapted to normally extend substantially parallel with the longitudinal median line of the platform, and to be simultaneously sprung laterally, one outward and the other inward, as indicated by full and dotted lines in Figure 3. The arms may be of any suitably resilient material, preferably steel, although seasoned resilient wood, such as hickory, may be employed. In this instance, the arms are extensions of elongated strips or bars 13$^a$, secured to the platform by bolts 14. The running gear includes rear wheels 15, on an axle 16, fixed to the rear portion of the platform. As here shown, the axle is centrally offset or underslung, and the bars 13$^a$ bear on the offset portion of the axle, and are secured to the latter by blocks 17.

The running gear includes also a steering-wheel 18, connected with the forward portions of the arms 13, and normally maintained thereby parallel with the rear wheels, so that the vehicle normally runs in a straight course. The steering wheel may be mounted to rotate on a fixed axle 19, extending through the arms 13, and fixed thereto by any suitable means, such as keys 20, as indicated by Figure 4, the axle and the means fixing it to the arms causing the arms to be deflected simultaneously by pressure applied at the outer side of either arm.

I provide foot rests projecting outward from each arm, so that pressure of one of the rider's feet on the rest at either side of the arms will cause the simultaneous deflection of the two arms, one being deflected inward and the other outward. Preferably the foot rests are extensions 21 of the fixed axle 19.

In the modification shown by Figure 5, short journals 22 are fixed to the steering-wheel and are journaled to rotate in bearings in the arms 13. The journals may be provided with shoulders 23, bearing on opposite sides of the arms, so that the journals and the steering-wheel cause the arms to be deflected simultaneously by pressure applied at the outer side of either arm. In this modification, independent foot rests 21$^a$ are provided.

It will now be seen that if the rider wishes to proceed straight ahead, he will exert equal pressure on the two foot rests, and that if he wishes to change the course, he will increase the pressure of one foot, and thereby deflect the arms 13, and move the steering-wheel out of parallelism with the rear wheels. If the seat is removed, the rider may lie face downward on the platform and exert pressure on the rests 21 or 21$^a$ by his hands.

The platform may be elongated by an extension 12$^a$, projecting over portions of the arms 13, without attachment thereto.

It will be seen by reference to Figure 3, that when pressure is increased on either foot rest, the arm 13 connected with the other foot rest is bowed inward sufficiently to decrease the distance in a straight line between its fixed inner end and the axle of the steering-wheel, thus permitting the illustrated deflection of the steering-wheel, and that when pressure is equal on the foot rests, or entirely removed therefrom, the arms and steering-wheel will assume the positions shown by Figure 2. The width of the arms between their top and bottom edges must be sufficient to prevent downward bowing of the arms by the load, or in other words, to render the arms vertically non-resilient, so that they cannot sag or bend in a vertical plane. The thickness of the arms should be considerably less than their width, to render the arms laterally resilient, and permit the lateral swinging of the arms and the inward bowing of one arm, as shown by Figure 3.

The arms 13 collectively constitute an embodiment of supporting means engaged with the axle of the steering-wheel and connecting said axle with the platform, said means being transversely resilient and adapted to normally maintain the steering-wheel substantially parallel with the rear wheels, to direct the vehicle in a straight course, and vertically non-resilient to prevent downward yielding of the forward portion of the platform.

Figure 6 shows a different embodiment of said supporting means, including a single resilient arm or bar 25, which is an extension of a bar 25$^a$ fixed as by bolts 26 to the longitudinal center of the platform, and a forward portion projecting forward from the platform and provided with a fork 27, to the arms of which the axle 19 of the steering-wheel 18 is secured. The steering-wheel is normally maintained substantially parallel with the rear wheels by the arm and fork.

The arm 25 may be proportioned like the arms 13, although preferably thicker, and is laterally resilient and vertically non-resilient. The foot rests may be extensions of the axle 19, and the arrangement is such that unbalanced pressure exerted on either foot rest deflects the steering-wheel from parallelism with the rear wheels and changes the course of the vehicle.

In each of the embodiments shown the vehicle body includes a rigid rear portion and a resilient forward portion. In the preferred embodiment shown by Figures 1, 2 and 3, the rigid portion is composed of the platform 12 and the bars 13$^a$ fixed to the longitudinal edges of the platform. The resilient forward portion is a two-part portion formed by the spaced apart resilient arms 13, which are resilient extensions of the fixed bars 13$^a$. In Figure 6 the rigid portion is composed of the platform and the bar 25$^a$ fixed to the longitudinal central portion of the platform. The resilient forward portion is a one-part portion formed by the single resilient arm 25, which is an extension of the bar 25$^a$ and by the fork 27.

In each embodiment the forward portion is adapted to normally maintain the steering wheel in position to cause movement of the vehicle in a straight path and to be flexed horizontally toward either side of the longitudinal median line of the vehicle, to cause movement in a curved path, the forward portion being in each case inflexible vertically to prevent sagging.

I claim:

1. A child's wheeled vehicle comprising a body including a rigid rear portion and a resilient forward portion, rear wheels on an axle connected with the rear portion, a steering wheel on an axle connected with the forward extremity of the forward portion, and foot rests connected with the forward portion at opposite sides of the steering wheel, the forward portion being adapted to normally maintain the steering wheel in position to cause movement of the vehicle in a straight path, and to be flexed horizontally toward either side of the longitudinal median line of the vehicle, to cause movement in a curved path, the forward portion being inflexible vertically and thereby adapted to prevent sagging.

2. A child's vehicle comprising a platform, longitudinal bars fixed rigidly to the platform at opposite edges thereof, said platform and bars constituting a rigid rear portion of the vehicle body, the bars being provided with forwardly projecting, resilient, spaced apart extensions, collectively constituting a resilient forward portion of the body, rear wheels on an axle connected with the rear portion, a steering wheel on an axle connected with the forward ends of the extensions, the wheel being located between the extensions, and foot rests connected with the extensions at opposite sides of the steering wheel, the said extensions being adapted to normally maintain the steering wheel in position to cause movement of the vehicle in a straight path, and to be flexed horizontally toward either side of the longitudinal median line of the vehicle, to cause movement in a curved path, the extensions being inflexible vertically, so that they prevent sagging.

In testimony whereof I have affixed my signature.

FRANK F. B. CHAPMAN.